May 24, 1960 G. R. KERN 2,937,444
FLUID DRIVE DENTAL HANDPIECE AND SYSTEM
Filed March 26, 1957 3 Sheets-Sheet 1
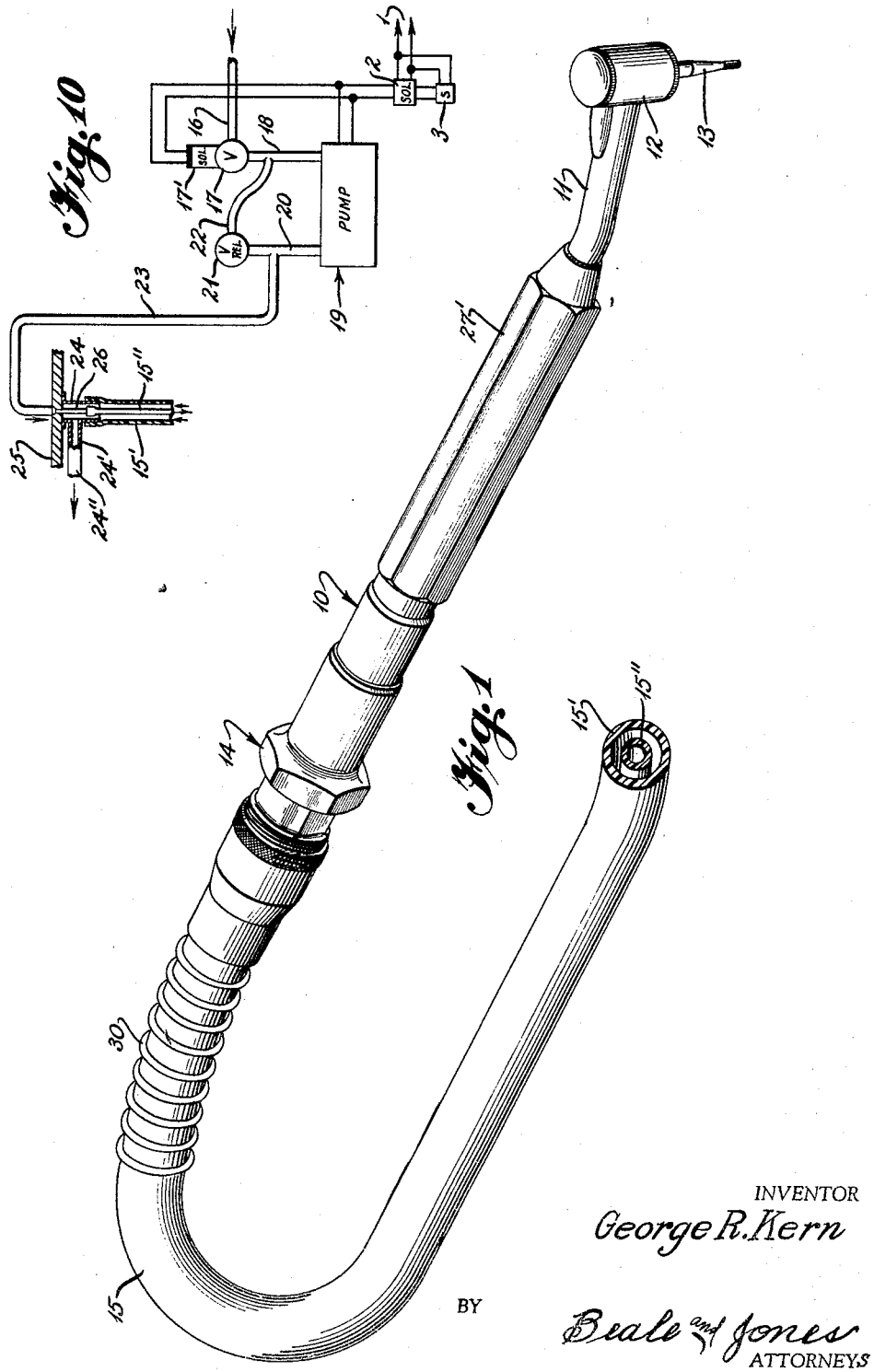
INVENTOR
George R. Kern
BY
Beale and Jones
ATTORNEYS May 24, 1960
G. R. KERN
2,937,444
FLUID DRIVE DENTAL HANDPIECE AND SYSTEM
Filed March 26, 1957
3 Sheets-Sheet 2
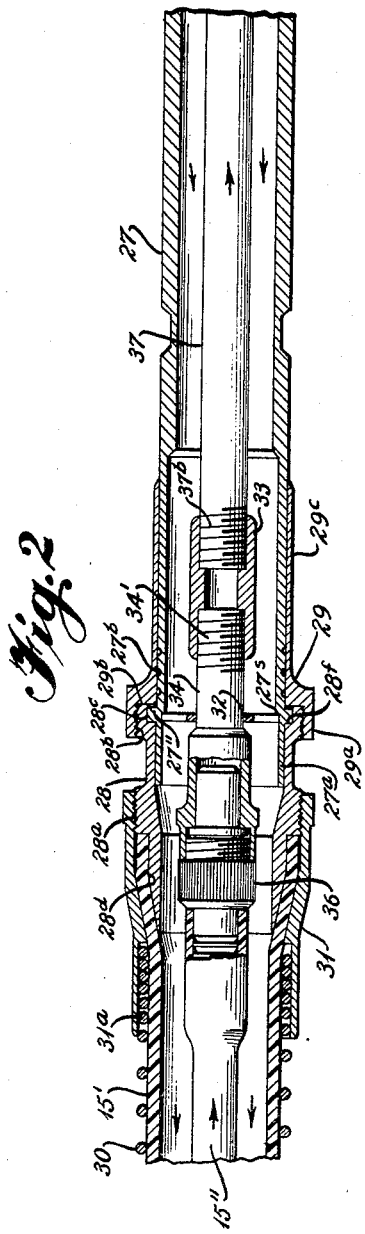
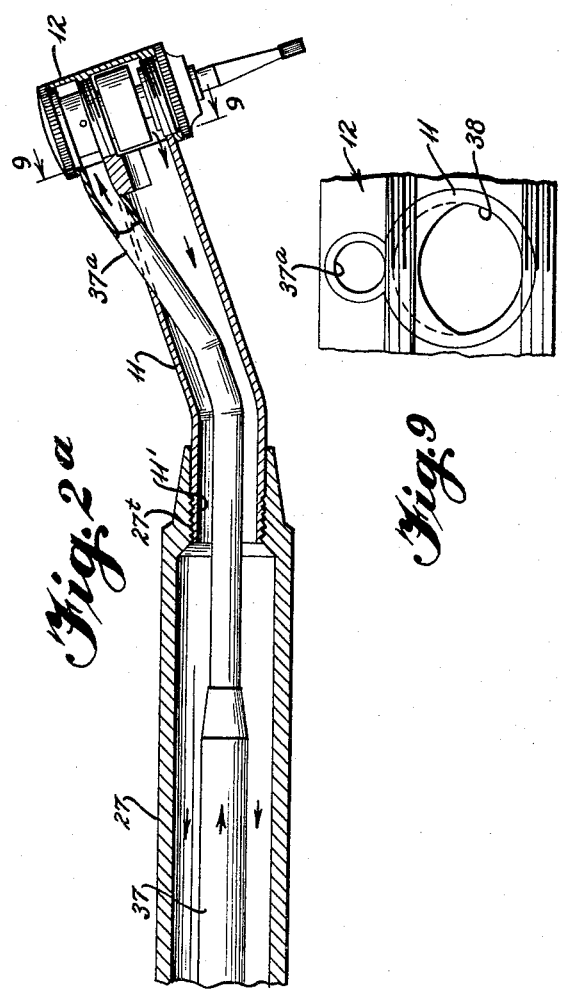
INVENTOR
George R. Kern
BY Beal and Jones
ATTORNEYS May 24, 1960 G. R. KERN 2,937,444
FLUID DRIVE DENTAL HANDPIECE AND SYSTEM
Filed March 26, 1957 3 Sheets-Sheet 3
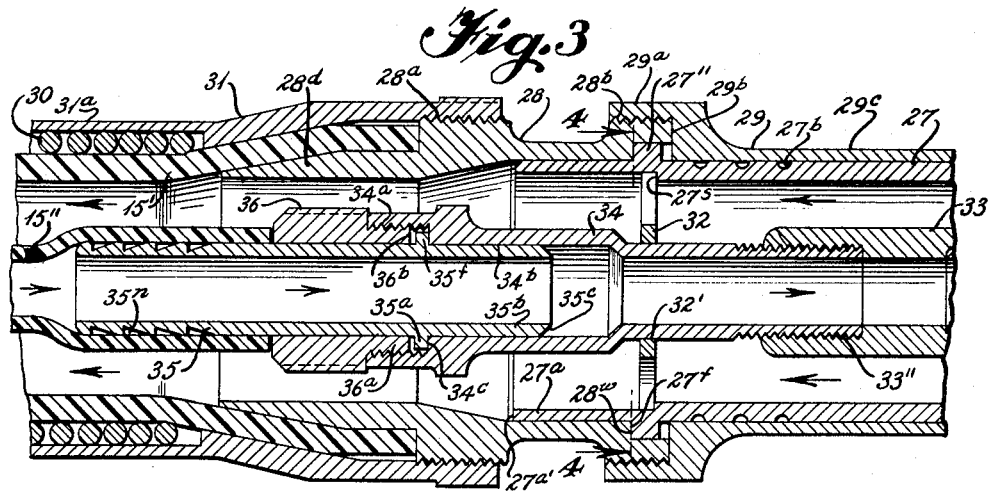
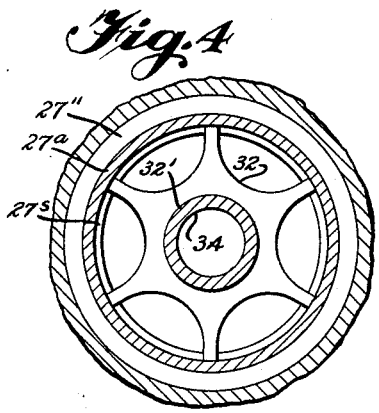
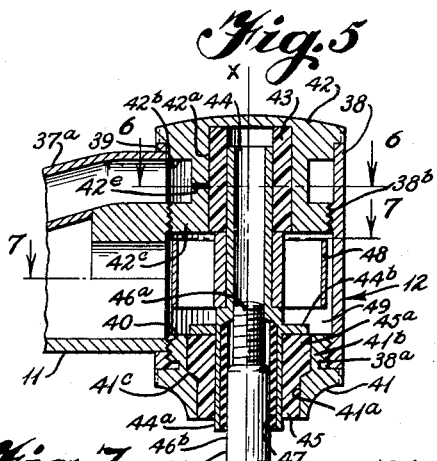
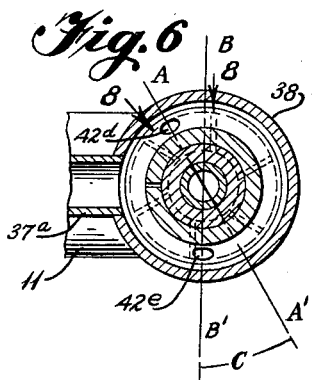
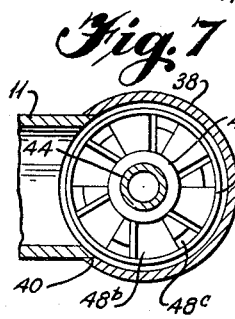
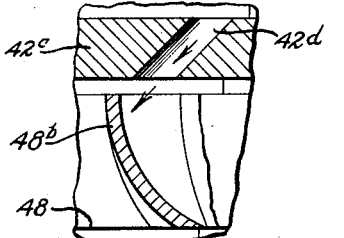
INVENTOR
George R. Kern
BY
Beale and Jones
ATTORNEYS

United States Patent Office 2,937,444
Patented May 24, 1960

2,937,444

FLUID DRIVE DENTAL HANDPIECE AND SYSTEM

George R. Kern, North Arlington, Va., assignor to Fairfax Manufacturing Company, Inc., Falls Church, Va., a corporation of Virginia Filed Mar. 26, 1957, Ser. No. 648,540

10 Claims. (Cl. 32—27)

This invention is directed to improvements in a dental handpiece equipped with a fluid drive motor and a system including fluid power with fluid power transfer to the dental handpiece.

An object of my invention is to provide a system of fluid power supply through a dental handpiece having a fluid motor on the distal end thereof wherein when fluid pressure is applied to the dental handpiece to drive said motor the handpiece is locked in a selected position and a seal is afforded to prevent leakage of the high pressure fluid supply.

A further object of the invention is to provide a fluid motor mounted at the distal end of a handpiece which will develop drill speeds in the range of about 65,000 to 70,000 r.p.m. and which has a relatively high stopping torque of the order of 16 ozs. of pressure applied between the dental drill and a tooth before stoppage of the dental drill is reached.

Another object of the invention is to provide a system of fluid supply under pressure for a rotor motor in a dental handpiece which does not reuse the fluid and thus provides for dissipation of heat through the used fluid which is not reused.

A further object of the invention is to provide in a fluid drive motor for a dental handpiece an arrangement for successive impulses on the rotary element of the fluid motor through a pair of fluid supply nozzles wherein one of the nozzles is positioned approximately 30° from a 180° phase relationship with respect to the other nozzle.

A still further object of the invention is to provide in a dental handpiece a fluid motor having a generally cylindrical shaped shell which receives a bearing carrying cap in each end that in turn supports each end of a spindle adapted to have mounted thereon the rotor of the fluid motor and hollow at one end to detachably receive the end of a dental drill or burr.

A still further object of my invention is to provide in a dental handpiece coaxial fluid supply and discharge coaxial conduits wherein at least one of the coaxial conduits is swivelly mounted with respect to an adjoining part and carries in the swivel mounting a fluid pressure lock that upon having fluid pressure applied thereto in the coaxial conduit locks one coaxial conduit portion with respect to its adjacent conduit portion.

Still further objects and the entire scope of applicability of the present invention will become apparent from the detailed description given hereinafter. It should be understood, however, that the detailed description and specific example is given by way of illustration only and, while indicating preferred embodiment of the invention, is not given by way of limitation, since various changes and modifications within the spirit and scope of the invention will become apparent to those skilled in the art from this detailed description.

For a more complete understanding of the nature and scope of my invention, reference may be had to the drawings in which:

Fig. 1 is a perspective view of the dental handpiece with the coaxial fluid conduit attached thereto;

Fig. 2 is a cross sectional view of the swivel connection in the dental handpiece shown in Fig. 1;

Fig. 2a is a cross sectional view in part of the distal end of the dental handpiece;

Fig. 3 is an enlarged cross sectional view on an enlarged scale of a portion of the dental handpiece showing the swivel connections of the two coaxial conduits and the fluid locks of each of these coaxial conduits;

Fig. 4 is a sectional view along line 4—4 of Fig. 3 showing the spider support mounting of the inner coaxial conduit with respect to the outer coaxial conduit;

Fig. 5 is a cross sectional view of the fluid motor drawn to an enlarged scale;

Fig. 6 is a sectional view along line 6—6 of Fig. 5 showing the upper bearing and nozzle plate and the position of the impeller blades with respect to the nozzles in the nozzle plates;

Fig. 7 is a sectional view through the fluid motor along line 7—7 of Fig. 5 showing the mounting of the impeller within the motor shell;

Fig. 8 is a sectional view on an enlarged scale along line 8—8 of Fig. 6 showing the relative position of a nozzle with respect to the impeller blades of the rotor member of the motor;

Fig. 9 is a cross sectional view along line 9—9 of Fig. 2a showing the fluid supply conduit connection with the shell of the motor and the connection of the exhaust conduit adjacent the motor; and Fig. 10 is a schematic diagram of the fluid pressure pump system and coaxial fluid pressure supply lines.

Throughout the various figures of the drawings like reference numerals refer to similar parts.

In Fig. 1 there is shown an assembly comprising the handpiece generally indicated at 10 having a contra-angle 11, a fluid motor generally indicated at 12 to receive a typical dental burr 13. The handpiece 10 includes a swivel connection generally indicated at 14 which couples a coaxial conduit 15 having a large outside conduit 15' encircling a smaller inside conduit 15". The inside conduit 15" supplies high pressure fluid while the outside larger conduit 15' acts as the carrier for the exhaust fluid at a low pressure after leaving the fluid motor 12.

In Fig. 10 there is shown the fluid pressure supply system which includes a supply pipe typically indicated at 16 which, for example, is connected to a fluid source such as the city water pressure line which supplies pressure at about 40 pounds per square inch, a solenoid actuated valve 17, a supply line 18 leading to the motor driven pump generally indicated at 19. Pump 19 is motor driven and is shown as a unit with a discharge line 20 to which is connected a relief valve 21 and a bypass line 22. Connected to the discharge line 20 is a fluid pressure supply line 23 leading to a fitting generally indicated at 24 supported on a portion of the dental engine at 25. Fitting 24 is in the form of a T-connection through which is coaxially led a nipple 26 that is attached to the end of the high pressure fluid supply conduit 15" as shown in Fig. 1. The low pressure or exhaust fluid is carried through line 15' and it is attached to the T-fitting 24 as shown in Fig. 10. The other lead 24' of the T-fitting serves as a discharge for the exhausted fluid which is passed through the fluid motor 12. The exhaust lead 24" can be connected with the normal drain system of a sewerage system. The pump supplies a water pressure of from about 180 to 200 pounds per square inch.

An electrical supply is indicated at 1 and it passes through a solenoid actuated switch 2 actuated by a foot actuator generally indicated at 3 such as an electrical switch. Solenoid switch 2 completes a circuit to the pump 19 and the solenoid 17' of valve 17. When the dentist steps on switch 3 the pump starts and valve 17 is opened so that fluid pressure is supplied to lines 20, 23, and 15'. When it is desired to stop motor 12, the dentist merely relaxes pressure on foot switch 3. A relief valve 21 is provided in a bypass line 22 leading from pressure line 20 to bypass around valve V to supply line 18 of pump assembly 19.

A particular important feature of the assembly of handpiece and coaxial conduit for fluid pressure supply and exhaust is the swivel connections in the head of the handpiece.

The handpiece has a main body 27 as shown in Figs. 2 and 3 and this may be formed with planar sides as shown in Fig. 1 at 27' to facilitate its grasp by the hand of the dentist. Main body 27 is formed with an annular shoulder 27" spaced in from its rear or inner end as shown in Figs. 2 and 3. This annular shoulder and the cylindrical end proximal thereto as indicated at 27a at the end of the main body is telescopically received within a special coupling 28. Coupling 28 is threaded at 28a intermediate its ends and at its forward or right hand end it is threaded at 28b where it has an annular recess 28c within which is received the annular shoulder 27" on the main body 27. The annular recess 28c has a length slightly longer than the width of the shoulder 27" and the cylindrical portion 27a at the end of the body 27 is telescopically received in the surrounding cylindrical portion of the special coupling 28. While it is hard to show a clearance there is a slight clearance between the members 27a and the surrounding member 28 the purpose of which will be explained hereinafter. A threaded portion 28b of the coupling 28 receives a sleeved coupling nut 29 having an internal threaded nut portion 29a with a transverse or radially extending shoulder 29b. The annular shoulder 27" has a slight telescopic movement in its mounting and when fluid pressure exists within the coupling 28 there is slight seepage between the members 27a and 28 so as to apply fluid pressure against the face 27f of the annular shoulder 27" and move the shoulder 27" as a piston to the right, as viewed in Fig. 3, against the shoulder 29b in nut member 29. Fluid pressure also acts on the radial face 27a' on cylindrical portion 27a of the main body 27 to move the swivel members into locking position. It will be noted that nut member 29 has a long sleeve 29c which surrounds the inner portion of the body member 27. Body member 27 is formed with spaced apart annular grooves within the nut member 29 as indicated at 27b to receive packing grease and to form a seal to prevent leakage between the nut 29c and the surrounding inner portion of body member 27. The coupling 28 is formed with a nipple end 28d which is tapered to a smaller end to receive the end of the flexible fluid exhaust conduit 15'. The end 15' is surrounded by reinforcing coiled spring member 30 which fits within an annular recess 31a formed within a sleeve coupling nut 31 that is threadedly received on 28a.

In the inner or rear end of the main body member 27 at a point within the annular flange 27" there is formed a cylindrical shoulder 27s which receives a circular spider member 32 having a central aperture 32', best shown in Fig. 4, which acts as a support and spacer for the high pressure supply conduit portion 34.

The inner conduit 15" for the high pressure fluid and its swivel connection is best illustrated in the enlarged drawing in Fig. 3. Within the main body 27 of the handpiece is the inner coaxial tubular member 37 which extends within the main body member 27 to the distal end thereof where it extends as conduit 37a within the contra-angle 11 and projects out through the wall of contra-angle 11 to join with an aperture 39 of the fluid motor 12 as will hereinafter be explained. The inner end of member 37 is externally threaded at 37b and it is connected to the externally threaded end 34' of nipple 34 by a coupling 33. Nipple member 34 is supported within central aperture 32' in the spider member 32. The inner end of the nipple member 34 is enlarged and is internally threaded at 34a and has a cylindrical inner cavity 34b separated from the internally threaded portion 34a by a shoulder 34c. A coupling member or nipple member 35 is formed with an annular flange or shoulder 35a received within the internally threaded portion 34a of nipple 34 adjacent the shoulder 34c and in a telescopic manner within the cylindrical portion 34b. While the clearance between the member 34b and the member 35 therewith in as at 35b is rather imperceptible there is sufficient clearance to permit fluid seepage from the high pressure fluid within the nipple 34 so as to act on the annular flange 35a. Nipple member 35 is held in telescopic engagement within the nipple member 34 by a threaded sealing gland 36 having an externally threaded shoulder portion 36a received within the internally threaded portion 34a so that it is in spaced relationship with the shoulder 34c to provide for slight reciprocating movement of the member 35 and seating of the annular flange 35a against the flat shoulder portion 36b on the gland 36 to form a fluid seal and lock. Fluid pressure also acts on the end 35c of member 35 to provide a locking thrust thereon to hold flange 35a against shoulder 36b. The inner end of the member 35 is formed with suitable notchings as at 35n to receive thereover the flexible high pressure inner coaxial conduit 15". The forward end of member 33 is coupled by conduit 37 which extends coaxially within the main body portion 27 up through the contra-angle 11 and out the wall thereof as indicated in Fig. 2a where it extends at 37a and connects with an aperture 39 in the cylindrical shell or housing 38 of the fluid motor 12. The contra-angle outer shell 11 is externally threaded at 11' and received within the internal threaded end of main body member 27 as at 27t. Reference to Fig. 9 shows the high pressure fluid conduit 37a and its connection with the shell of motor 12 and also the contra-angle shell portion 11 which serves as the exhaust for the fluid from the motor 12 where it communicates with the exhaust aperture 40 of the motor.

Fluid motor 12 is formed with a cylindrical open ended shell 38 having an inlet aperture 39 within which is received the end 37a of the high pressure conduit while an exhaust aperture 40 of a much larger size receives the end of the contra-angle shell 11 and serves as an exhaust passage for the fluid having passed through the motor 12. Cylindrical shell 38 forms a casing for the motor and it is formed with internal threads at its lower end at 38a and with internal threads at a position spaced down from the upper end at 38b to receive in the respective threaded portions a lower externally threaded bearing cap 41 and an upper bearing cap 42.

Upper cap 42 is formed with a centrally disposed axially extending bearing recess 42a, an annular recess 42b in line with fluid pressure inlet aperture 39 and the fluid pressure conduit 37a and a lower annular plate like portion 42c which is externally threaded and received by the internal threads 38b. The lower annular plate portion 42c, as shown in Figs. 6 and 8, has orifices 42d and 42e formed therein which extend at a 45° angle from top to bottom and serve as jets. It will be noted that the orifice 42e, see Fig. 6, lies on a diameter line B—B' which is displaced approximately 30° as indicated by angle C from the diameter line A—A'. Thus, the orifice 42e is out of phase by 30° or thereabouts from direct opposite phase or from being directly opposite the orifice 42d as shown best in Fig. 6. Referring back to Fig. 5 and the cap 42 there is formed therein a fluid passage orifice 42e which extends to communicate with the bearing receiving recess 42a. Extending through the center of motor 12 is a central axis XX' and the center of the bearing recess 42a of cap 42 lies on this axis. Mounted in cap 42 is an upper bearing sleeve 43 of material such as "Rulon B" and it receives cooling means through the aperture 42e from the annular recess 42b through which fluid under pressure passes and is supplied to the orifices or jets 42d and 42e. A spindle 44 lying on the axis X—X' is supported at its upper end within the bearing member 43 while its bottom enlarged end 44a is received within a bearing member 45 housed within a bearing receiving recess 41a formed within the lower cap 41. Bearing member 45 is formed with an enlarged upper portion 45a which is received within an enlarged recess 41b in the cap 41 and rests against a shoulder 41c so as to prevent the bearing member 45 moving through the cap in the downward direction. Bearing member 45 serves as a thrust bearing as will be described. Spindle 44 is hollow and has a thrust shoulder 44b formed thereon in spaced relation from its lower end and this rides against the upper surface of bearing member 45a. A typical burr or dental cutter 46 having a threaded or serrated surface upper end of reduced size is received within the cylindrical aperture of the spindle 44 while the lower enlarged portion 46b is held tightly within a rubber sleeve jacket 47 secured within the enlarged lower end portion 44a of spindle 44 so as to steady and align the burr 46 with the axis X—X' of the motor. An impeller or rotor member 48 is formed with a central apertured hub 48a which is press-fitted over the spindle 44 that has a slightly enlarged portion adjacent the rotor as compared with the upper end of the spindle 44. Rotor 48 shown in an enlarged sectional form in Fig. 8 has six curved blades 48b, each of which forms pocket-like blade members to receive thrust from the jets 42d and 42e. Rotor member 48 has the blades at the bottom spaced apart as at 48c for the fluid to escape and exhaust into the chamber 49 formed between the top of the lower cap 41 and the bottom of rotor 48 which is spaced vertically thereabove. The exhaust fluid passes from the chamber 49 through the exhaust aperture 40 in the shell 38 and on into the large exhaust conduit 11 and in turn into the body member 27 and out through the flexible exhaust conduit 15'.

In the particular rotor here shown there are six blades. If the orifices or jets 42d and 42e were in phase, in other words 180° apart, and both laid at opposite ends of the diameter A—A', then there would be two jets acting on the blades and two of six blades would always be acted upon simultaneously, and hence there would be three impulses per single rotation of the impeller or rotor 48. More even application of power is afforded by displacing one of the jets in an offset position as by the angle C so that a jet is always acting on a single blade and hence there are six successive impulses. It would appear that more jets should be used but these additional jets should be smaller to provide more even power. This does not work out in practice as the water pressure is limited by the return or exhaust opening. Hence, if more jets were used smaller jet passages would be required and this would result in atomization of the fluid which is undesirable particularly when fluid such as water is utilized. Therefore, two larger jets such as 42d and 42e are a practical compromise. Even when the number of jets or orifices was increased to four and thus the respective size of each was reduced to provide the proper pressure balance there was found to be atomization taking place which is an undesirable condition when water was used under pressure.

There has thus been provided in the swivel construction a means by which the dentist can adjust the handpiece to the desired angle of the contra-angle end then by applying the fluid power, the handpiece is locked in this position in his hand. Besides being locked in selected position, there is formed a fluid tight seal so as to prevent high pressure fluid leakage. The handpiece is so designed that the outer surface planar surfaces 27' rest on the hand between the thumb and index finger while the contra-angle portion 11 is grasped easily and comfortably between the thumb and the index and second finger. The handpiece is small and compact in total outside diameter and is easily manipulated considering that fluid pressure of some 180 to 200 pounds per square inch is carried therein at the rate of about one gallon per minute.

The miniature motor 12 is very powerful and efficient for its size. It is rugged in construction and provided with the novel arrangement of composition bearings it is very quiet in operation. The novel offset jet arrangement provides an even flow of power to drive the rotor 48 and the spindle 44 which receives in a centering manner the burr such as 46. Speeds in the range of about 65,000 to 70,000 r.p.m. are attained with adequate torque to easily handle large diameter dental cutters. This dental handpiece speeds up the dental operations. In preparatory work as in cutting a tooth for a crown and for bridge work the time of ordinary cutting has been decreased from about 45 minutes to a matter of about 10 minutes. This dental handpiece according to this invention is powered by a fluid system which provides for carrying away of possible heat by non-reuse of the fluid and at the same time provides for a much more hygienic system since fluid for motive power is not reused.

I claim:

1. A dental apparatus comprising in combination, a main body member having a fluid supply passage and a fluid exhaust passage extending therethrough, a fluid supply line and a fluid exhaust line, a swivel joint connecting said fluid supply line and said main body and the fluid supply passage therein, a swivel joint connecting said fluid exhaust line and said main body and the fluid exhaust passage therein, said swivel joints permitting complete rotation and selective setting of relative rotative positioning of said main body and the supply and exhaust passages therein with respect to the fluid supply and exhaust lines, said main body having an extension at its distal end, a fluid motor fixed to the distal end of said body extension and adapted to receive and rotate dental burrs and the like, said fluid motor having a fluid pressure inlet and a fluid exhaust outlet, a fluid pressure supply conduit in the said extension connecting the fluid supply passage in the main body with the fluid pressure inlet of the motor, and a fluid exhaust conduit in the extension connecting the fluid exhaust outlet with the fluid exhaust passage in the main body.

2. A dental apparatus comprising in combination, a main body member having a fluid supply passage and a fluid exhaust passage extending therethrough, a fluid supply line and a fluid exhaust line, a swivel joint connecting said fluid supply line and said main body and the fluid supply passage therein, a swivel joint connecting said fluid exhaust line and said main body and the fluid exhaust passage therein, said main body having an extension at its distal end, a fluid motor fixed to the distal end of asid body extension and adapted to receive and rotate dental burrs and the like, said fluid motor having a fluid pressure inlet and a fluid exhaust outlet, a fluid pressure supply conduit in said extension connecting the fluid supply passage in the main body with the fluid pressure inlet in the motor, a fluid exhaust conduit in the extension connecting the fluid exhaust outlet of the motor with the fluid exhaust passage in the main body and fluid pressure lock means in the apparatus responsive to fluid pressure in said apparatus to lock the main body in a set position with respect to said fluid pressure supply and exhaust lines.

3. A dental apparatus comprising in combination, a main body member having a fluid supply passage and a fluid exhaust passage extending therethrough, a fluid supply line and a fluid exhaust line, a swivel joint connecting said fluid supply line and said main body and the fluid supply passage therein, a swivel joint connecting said fluid exhaust passage and said main body and the fluid exhaust line therein, said swivel joint for the fluid pressure line and passage in the main body having lock means and fluid sealing means responsive to fluid pressure to prevent swivel action when fluid is flowing therethrough and fluid leakage, said main body having an extension at its distal end, a fluid motor fixed to the distal end of said body extension and adapted to receive and rotate dental burrs and the like, said fluid motor having a fluid pressure inlet and a fluid exhaust outlet, a fluid pressure supply conduit in said extension connecting the fluid supply passage in the main body with the fluid pressure inlet of the motor, and a fluid exhaust conduit in the extension connecting the fluid exhaust outlet with the fluid exhaust passage in the main body.

4. A dental apparatus according to claim 3 wherein said main body extension is of contra-angle shape.

5. In a dental handpiece the combination of a tubular main body having a fluid supply passage extending therethrough, a fluid exhaust passage also extending therethrough, both of said passages being adapted to be connected to a fluid supply line and an exhaust line respectively, said main body terminating at its distal end in an extension having fluid supply and exhaust passages extending therein and in communication with the respective passages in the main body, a fluid motor attached to the distal end of the extension, said motor having an outer shell with a longitudinal axis therethrough, said shell having an inlet aperture and an exhaust aperture connected respectively to the supply and exhaust passages in said extension of the main body, a removable cap at one end of said shell, said cap having a central bearing extending about the axis of said cap and in line with the axis of said shell and a nozzle plate closing off the open end of said cap about the bearing therein, said nozzle plate having a pair of nozzles extending therethrough, one of said nozzles being located at a position displaced off of the diameter of the plate extending through the center of the other nozzle, a removable cap at the other end of said shell and having an aperture therethrough lying on the axis of said first cap and the axis of the shell, a bearing supported in said second cap about the axis thereof, a spindle extending with its axis lying in the axis of said shell and with the ends supported in the respective bearings in the cap, said spindle having a radially extending flange riding against said second bearing, an impeller having a hub mounted on said spindle with spaced apart blades extending generally radially outwardly and curving gradually upwardly towards said nozzle plate where fluid from said nozzles in the nozzle plate strikes against said blade, the other end of said impeller opposite to said nozzle end having the blades spaced apart to exhaust said fluids, said impeller being positioned in said spaced relation to said thrust flange, said exhaust opening in said shell communicating with the exhausting end of said impeller to receive exhaust fluid therefrom, said spindle being recessed at the end extending through said second cap and bearing thereof to receive a dental burr.

6. In combination in a dental handpiece an elongated tubular main body, a tubular extension at the distal end of said main body, said tubular main body and extension serving as a fluid discharge passageway, a fluid pressure supply conduit extending within said tubular main body and extension, a fluid motor having an inlet for fluid pressure supply and an exhaust outlet for exhaust fluid therefrom, said tubular extension being connected with the exhaust outlet in the motor and said fluid pressure supply conduit being connected with said fluid pressure inlet of the motor, said tubular main body at its inner end opposite to such extension at the distal end being cylindrical and having a radially extending annular flange thereon spaced in from the inner end of the main body, a tubular coupling member having a cylindrical end received in telescopic engagement over said inner cylindrical end of the main body and having an enlarged end adjacent said cylindrical portion telescopically extending over and slightly longer than the width of said radially extending annular flange on the main body, a sleeve coupling nut received over the main body adjacent the radially extending annular flange on the main body and detachably coupled to said enlarged end of said tubular coupling, said tubular coupling being adapted to receive a flexible fluid exhaust conduit at its other end, means for securing said flexible fluid exhaust to said tubular coupling, said fluid pressure supply conduit extending within the main body terminating at its inner end opposite to said end connected to said motor and having an inner cylindrical portion, a nipple member having a radially extending flange adjacent a cylindrical end, said cylindrical end of the nipple being telescopically received in said inner cylindrical end of the fluid pressure supply conduit, a second sleeve coupling nut receiver over said nipple and connected to an inner end portion of said fluid pressure supply conduit, said radially extending flange on the nipple being secured adjacent said second coupling nut and the inner end portion of the fluid pressure supply conduit for slight reciprocating motion therebetween, said nipple member being adapted to have secured thereto a flexible fluid pressure supply line, support means within said main body member for supporting said fluid pressure supply conduit therein, said first flange member and said second flange member swivelly acting in coupling said tubular coupling member to the main body and the fluid pressure supply conduit to the nipple member.

7. A dental handpiece according to claim 6 wherein there is a clearance between the cylindrical portion of the nipple member and the surrounding cylindrical portion of the fluid pressure supply conduit permitting fluid under pressure from said fluid pressure supply conduit to pass and act on said annular flange on the nipple to move same telescopically against said second sleeve coupling nut thereby preventing swiveling action.

8. A dental handpiece according to claim 7 wherein said tubular extension on said main body is in the form of a contra-angle.

9. A dental handpiece comprising in combination, a main body member having an extension at the distal end and a fluid supply passage and a fluid exhaust passage therethrough, means for coupling the main body to a fluid pressure supply conduit and an exhaust fluid conduit for communication with said fluid pressure supply passage and said fluid exhaust passage, a fluid motor connected to the extension of said main body and having a fluid supply inlet connected with the fluid supply passage in the main body and an exhaust outlet connected with the fluid exhaust outlet in the main body, said motor having a top and a bottom cap each supporting a bearing, a spindle supported between said bearings and having means at one end extending through the bottom cap to receive a dental burr or the like, a rotor member having a plurality of evenly spaced apart blades thereon, said top cap having a pair of orifice jets therein directing fluid against said blades, said top cap having a passage therein connecting said fluid pressure supply opening in the motor with the orifices, one of said orifices having an opening thereof lying on a diameter of said cap, the other of said orifices having a corresponding opening thereof lying displaced from said diameter on a radius equal to radius of said one orifice opening and at an angular displacement of an acute angle from said diameter.

10. A dental handpiece according to claim 9 wherein said acute angle of displacement is about 30°.

References Cited in the file of this patent
UNITED STATES PATENTS 2,799,934  Kern ---------------- July 23, 1957

FOREIGN PATENTS 163,217  Austria ---------------- Oct. 15, 1948